US012646699B2

(12) United States Patent
Takahashi et al.

(10) Patent No.: US 12,646,699 B2
(45) Date of Patent: Jun. 2, 2026

(54) MASS SPECTROMETRY METHOD AND MASS SPECTROMETER

(71) Applicant: SHIMADZU CORPORATION, Kyoto (JP)

(72) Inventors: Hidenori Takahashi, Kyoto (JP); Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 545 days.

(21) Appl. No.: 18/028,931

(22) PCT Filed: Jul. 30, 2021

(86) PCT No.: PCT/JP2021/028341
§ 371 (c)(1),
(2) Date: Mar. 28, 2023

(87) PCT Pub. No.: WO2022/070584
PCT Pub. Date: Apr. 7, 2022

(65) Prior Publication Data

US 2024/0030016 A1 Jan. 25, 2024

(30) Foreign Application Priority Data

Sep. 30, 2020 (JP) ................................ 2020-164543

(51) Int. Cl.
*H01J 49/00* (2006.01)

(52) U.S. Cl.
CPC ................................ *H01J 49/0072* (2013.01)

(58) Field of Classification Search
USPC .................................................. 250/281, 282
See application file for complete search history.

(56) References Cited

U.S. PATENT DOCUMENTS

2016/0372311 A1 12/2016 Takahashi et al.
2019/0004071 A1 1/2019 Takahashi et al.
(Continued)

FOREIGN PATENT DOCUMENTS

JP 2019-009058 A 1/2019
WO 2015/133259 A1 9/2015
(Continued)

OTHER PUBLICATIONS

Thomas De Vijlder, et al. "A Tutorial in small molecule identification via electrospray ionization-mass spectrometry: The practical art of structural elucidation", Mass Spectrometry Reviews, Oct. 3, 2018, pp. 307-629 (23 pages).
(Continued)

*Primary Examiner* — Kiet T Nguyen
(74) *Attorney, Agent, or Firm* — Sughrue Mion, PLLC

(57) ABSTRACT

A mass spectrometer including: a reaction chamber into which a precursor ion derived from a sample molecule is introduced; a collision gas supply part configured to supply collision gas to the reaction chamber; a radical supply part configured to supply hydrogen radicals, oxygen radicals, nitrogen radicals, or hydroxyl radicals to the reaction chamber; a dissociation operation control part configured to control operations of the collision gas supply part and the radical supply part to generate the product ions by collision-induced dissociation and radical attachment dissociation of the precursor ion inside the reaction chamber, an ion detection part configured to mass-separate and detect ions ejected from the reaction chamber, and a spectrum data generation part configured to generate spectrum data based on a detection result by the ion detection part.

14 Claims, 9 Drawing Sheets

(56) References Cited

U.S. PATENT DOCUMENTS

| | | | | |
|---|---|---|---|---|
| 2019/0088459 | A1* | 3/2019 | Takahashi | H01J 49/0072 |
| 2019/0108993 | A1 | 4/2019 | Sekiya et al. | |
| 2019/0285646 | A1 | 9/2019 | Clarke et al. | |
| 2019/0333748 | A1 | 10/2019 | Takahashi et al. | |
| 2020/0111654 | A1 | 4/2020 | Takahashi et al. | |
| 2021/0050198 | A1 | 2/2021 | Takahashi | |
| 2021/0166928 | A1* | 6/2021 | Takahashi | H01J 49/40 |

FOREIGN PATENT DOCUMENTS

| | | | |
|---|---|---|---|
| WO | 2017/126006 | A1 | 7/2017 |
| WO | 2018/186286 | A1 | 10/2018 |
| WO | 2019/155725 | A1 | 8/2019 |

OTHER PUBLICATIONS

Scott A. Robotham, et al., "Comparison of Ultraviolet Photodissociation and Collision Induced Dissociation of Adrenocorticotropic Hormone Peptides", American Society for Mass Spectrometry, 2015, pp. 1570-1579, (10 pages).

William R. Alley, Jr., et al. "Characterization of glycopeptides by combining collision-induced dissociation and electron-transfer dissociation mass spectrometry data", Rapid Communications in Mass Spectrometry, 2009, vol. 23, pp. 161-170 (10 pages).

Alex G. Harrison, "Energy-resolved Mass Spectrometry: a Comparison of Quadrupole Cell and Cone-voltage Collision-induced Dissociation", Rapid Communication in Mass Spectrometry, 1999, vol. 13, pp. 1663-1670 (8 pages).

Extended European Search Report dated Mar. 22, 2024 in Application No. 21874887.9.

Office Action issued Aug. 8, 2023 in Japanese Application No. 2022-553500.

Hidenori Takahashi et al., "Identifying Double Bond Positions in Phospholipids Using Liquid Chromatography-Triple Quadrupole Tandem Mass Spectrometry Based on Oxygen Attachment Dissociation", Mass Spectrometry, 2019, vol. 8, S0080, 6 pages.

International Search Report of PCT/JP2021/028341 dated Sep. 21, 2021 [PCT/ISA/210].

Written Opinion of PCT/JP2021/028341 dated Sep. 21, 2021 [PCT/ISA/237].

Communication issued Dec. 9, 2025 in European Application No. 21874887.9.

* cited by examiner

PC 16:0_20:4(n-6, n-9, n-12,n-15) THEORETICAL SPECTRUM

PC 14:0_22:4(n-8, n-11, n-14,n-17) THEORETICAL SPECTRUM

MASS SPECTROMETRY METHOD AND MASS SPECTROMETER

CROSS REFERENCE TO RELATED APPLICATIONS

This application is a National Stage of International Application No. PCT/JP2021/028341 filed on Jul. 30, 2021, claiming priority based on Japanese Patent Application No. 2020-164534 filed on Sep. 30, 2020.

TECHNICAL FIELD

The present invention relates to a mass spectrometry method and a mass spectrometer.

BACKGROUND ART

In order to identify a sample molecule that is a polymer compound and analyze its structure, a mass spectrometry is widely used in which ions having a specific mass-to-charge ratio are selected as precursor ions from ions derived from the sample molecule, the precursor ions are dissociated to generate product ions (also called fragment ions), and the product ions are separated according to the mass-to-charge ratios and detected. As a representative method for dissociating the ions in the mass spectrometry, a collision-induced dissociation (CID) method is known in which the precursor ions are collided with inert gas molecules such as a nitrogen gas and the precursor ions are dissociated by energy.

In the CID method, since the ions are dissociated by the collision energy with the inert gas molecules, various types of ions can be dissociated regardless of types of chemical bonds or the like. Thus, for example, an entire structure of a sample molecule can be estimated by dissociating precursor ions derived from the sample molecule to generate a plurality of product ions having molecular weights smaller than the weight of the precursor ions, and by estimating partial structures from the mass-to-charge ratios of the product ions. On the other hand, according to the CID method, the selectivity of types of chemical bonds at the site of dissociating a precursor ion is low. For example, a protein is a molecule in which a plurality of amino acids are linked via peptide bonds, and it is possible to efficiently perform a structural analysis if the position of the peptide bonds are specifically dissociated, but it is difficult to cause such dissociation in the CID method. In addition, if a sample molecule is a compound containing a hydrocarbon chain having an unsaturated bond site, the position of the unsaturated bond included in the hydrocarbon chain can be specified by specifically causing dissociation at the position of the unsaturated bond, but it is difficult to cause such dissociation in the CID method.

Patent Literatures 1 and 2 describe that radicals such as hydrogen radicals and oxygen radicals are attached to protein-derived precursor ions to cause unpaired electron-induced dissociation, and by this means, the precursor ions are dissociated at the position of the peptide bonds. The method for dissociating the precursor ions by irradiating the hydrogen radicals is called hydrogen attachment dissociation (Hydrogen Attachment/Abstraction Dissociation (HAD)) method, and the method for dissociating the precursor ions by irradiating the oxygen radicals is called oxygen attachment dissociation (Oxygen Attachment/Abstraction Dissociation (OAD)) method.

In addition, Patent Literature 3 describes that precursor ions derived from compounds such as a fatty acid are irradiated with oxygen radicals or hydroxyl radicals to dissociate precursor ions at a position of double bonds between carbon atoms.

CITATION LIST

Patent Literature

Patent Literature 1: WO 2015/133259 A
Patent Literature 2: WO 2018/186286 A
Patent Literature 3: WO 2019/155725 A

SUMMARY OF INVENTION

Technical Problem

In a dissociation method by radical irradiation such as the HAD method or the OAD method, the precursor ions derived from the sample molecule can be dissociated at a specific chemical bond site, but it is difficult to obtain structural information other than the chemical bond site. For example, phospholipids are those in which the fatty acid is bonded to a structure called a head group, and are classified into classes called phosphatidylcholine (PC), phosphatidylethanolamine (PE), phosphatidylglycerol (PG), phosphatidylinositol (PI), and the like according to a structure of the head group. When the precursor ions derived from phospholipids are dissociated using the HAD method or the OAD method, the product ions useful for the structural analysis of the fatty acid are obtained, but product ions capable of specifying the structure of the head group are hardly generated. As described above, conventionally, it has been difficult to obtain sufficient information for the structural analysis depending on types of compounds.

A problem to be solved by the present invention is to provide the mass spectrometry method and the mass spectrometer capable of obtaining more information useful for the structural analysis of a compound.

Solution to Problem

A mass spectrometry method according to the present invention made to solve the problem above includes steps of:

generating product ions by collision-induced dissociation and radical attachment dissociation of a precursor ion derived from a sample molecule; and obtaining product ion spectrum data by mass-separating and detecting the product ions.

In addition, a mass spectrometer according to the present invention made to solve the problem above includes:

a reaction chamber into which a precursor ion derived from a sample molecule is introduced;

a collision gas supply part configured to supply collision gas to the reaction chamber;

a radical supply part configured to supply hydrogen radicals, oxygen radicals, nitrogen radicals, or hydroxyl radicals to the reaction chamber;

a dissociation operation control part configured to control operations of the collision gas supply part and the radical supply part to generate product ions by collision-induced dissociation and radical attachment dissociation of the precursor ion inside the reaction chamber;

an ion detection part configured to mass-separate and detect ions ejected from the reaction chamber; and a spectrum data generation part configured to generate spectrum data based on a detection result by the ion detection part.

Advantageous Effects of Invention

In the mass spectrometry method and the mass spectrometer according to the present invention, regarding the precursor ion derived from the sample molecule, both the collision-induced dissociation for dissociating by collision with collision gas molecules and the radical attachment dissociation for dissociating by attachment of the radicals are performed. The collision-induced dissociation and the radical attachment dissociation may be performed simultaneously, or may be performed sequentially. In the radical attachment dissociation, according to an intended dissociation mode, the hydrogen radicals, the oxygen radicals, the nitrogen radicals, or the hydroxyl radicals is attached to the precursor ion. The types of radicals to be used in the radical attachment dissociation are not limited to one type, and may be a plurality of types. For example, when water vapor is used as a raw material gas, both the oxygen radicals and the hydroxyl radicals can be simultaneously generated and attached to the precursor ion.

In the mass spectrometry method and the mass spectrometer according to the present invention, both the product ions generated by the collision-induced dissociation of the precursor ion and the product ions generated by the radical attachment dissociation of the precursor ion are detected. For example, when the sample molecule is phospholipids, information useful for estimating a structure of the head group is obtained from the former product ions, and information useful for estimating a structure of the fatty acid is obtained from the latter product ions. As described above, in the present invention, since both the collision-induced dissociation and the radical attachment dissociation are performed, more information useful for the structural analysis of a compound can be obtained by mass spectrometry performed once.

In addition, in the mass spectrometry method and the mass spectrometer according to the present invention, besides the product ions described above, product ions generated by further radical attachment dissociation of the product ions generated by the collision-induced dissociation of the precursor ion, and/or product ions generated by further collision-induced dissociation of the product ions generated by the radical attachment dissociation of the precursor ion can also be detected. All of the product ions are product ions generated by dissociating the precursor ion twice. For example, in a mass spectrometer using a collision cell as a reaction chamber like a triple quadrupole mass spectrometer, conventionally, only an MS/MS ($MS^2$) analysis for generating and detecting product ions by dissociating a precursor ion once can be performed. However, an $MS^3$ analysis can be performed in a pseudo manner by using the present invention.

DESCRIPTION OF EMBODIMENTS

A mass spectrometer 1 of the First Example and a mass spectrometer 2 of the Second Example, which are examples of ion analyzers according to the present invention, will be described below with reference to the drawings.

Figure 1:
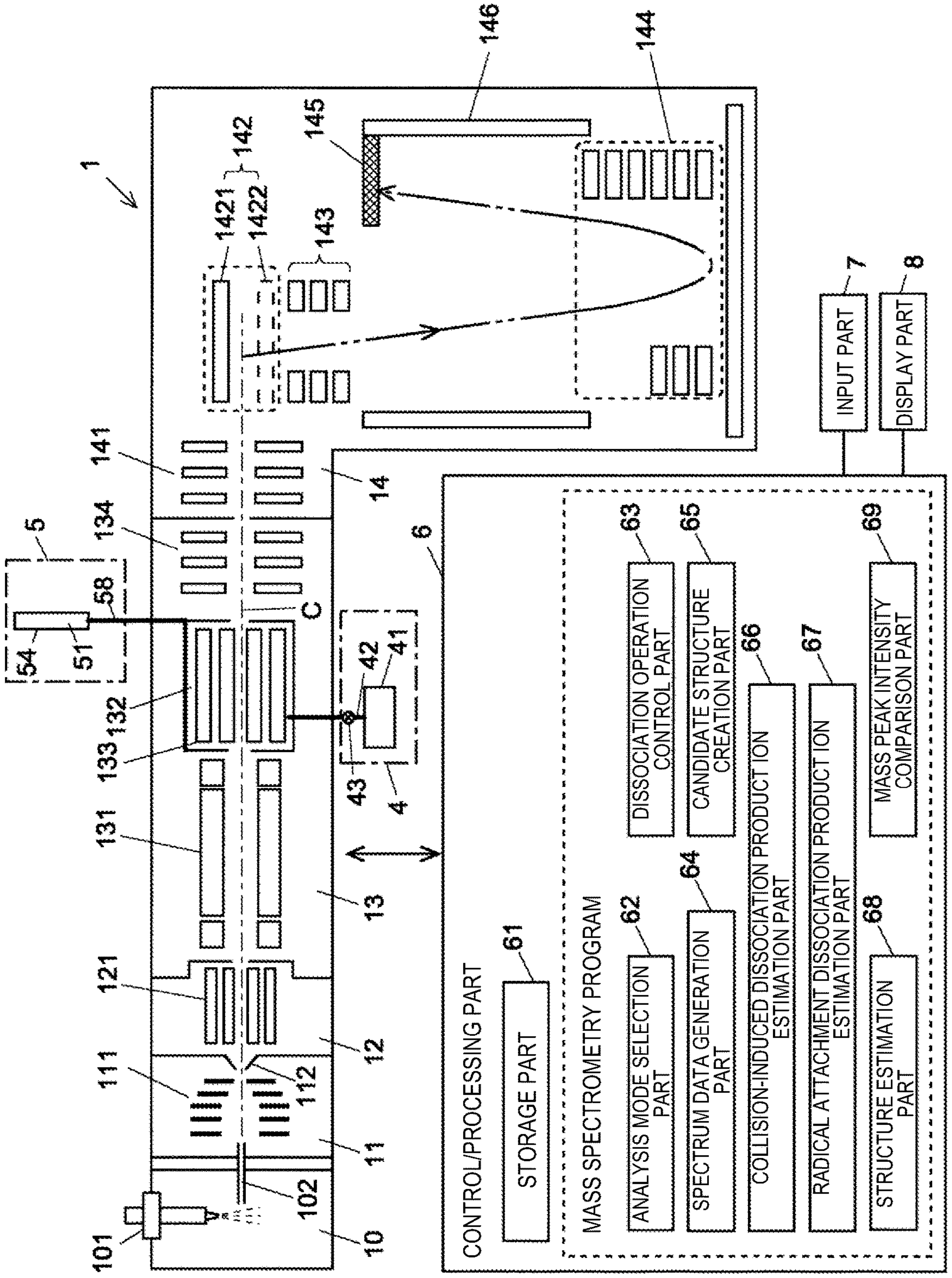
FIG. 1 is a schematic configuration diagram of a mass spectrometer of a First Example which is an example of the mass spectrometer according to the present invention.

FIG. 1 is the schematic configuration of the mass spectrometer 1 of the First Example. The mass spectrometer 1 generally includes a mass spectrometer main body and a control/processing part 6.

The mass spectrometer main body has a configuration of a multi-stage differential exhaust system including a first intermediate vacuum chamber 11; a second intermediate vacuum chamber 12; and a third intermediate vacuum chamber 13 in which a degree of vacuum is increased stepwise between an ionization chamber 10 at substantially atmospheric pressure and a high vacuum analysis chamber 14 evacuated by a vacuum pump (not illustrated). The ionization chamber 10 is provided with an electrospray ionization probe (ESI probe) 101 for nebulizing a liquid sample while imparting electric charges to the liquid sample. The liquid sample may be directly supplied into the ESI probe 101, or a sample component separated from other components contained in the liquid sample by a column of a liquid chromatograph may be introduced.

The ionization chamber 10 and the first intermediate vacuum chamber 11 communicate with each other through a small diameter heating capillary 102. An ion lens 111 including a plurality of ring-shaped electrodes having different diameters is arranged in the first intermediate vacuum chamber 11. The first intermediate vacuum chamber 11 and the second intermediate vacuum chamber 12 are separated from each other by a skimmer 112 having a small hole at its top. In the second intermediate vacuum chamber 12, an ion guide 121 including a plurality of rod electrodes arranged so as to surround an ion optical axis C is arranged.

In the third intermediate vacuum chamber 13, there are arranged: a quadrupole mass filter 131 to separate the ions according to the mass-to-charge ratios; a collision cell 132 including a multipole ion guide 133 inside; an ion guide 134 to transport the ions discharged from the collision cell 132. The ion guide 134 includes a plurality of ring-shaped electrodes having a same diameter.

A collision gas supply part 4 is connected to the collision cell 132. The collision gas supply part 4 includes a collision gas source 41; a gas introduction flow path 42 for introducing gas from the collision gas source 41 into the collision cell 132; and a valve 43 for opening and closing the gas introduction flow path 42. As the collision gas, for example, an inert gas such as the nitrogen gas or an argon gas is used. Alternatively, a raw material gas to be described later can be used as the collision gas. When the raw material gas is also used as the collision gas, a raw material gas source 56 may also be used as the collision gas source 41, and it is not necessary to individually provide them.

Figure 2:
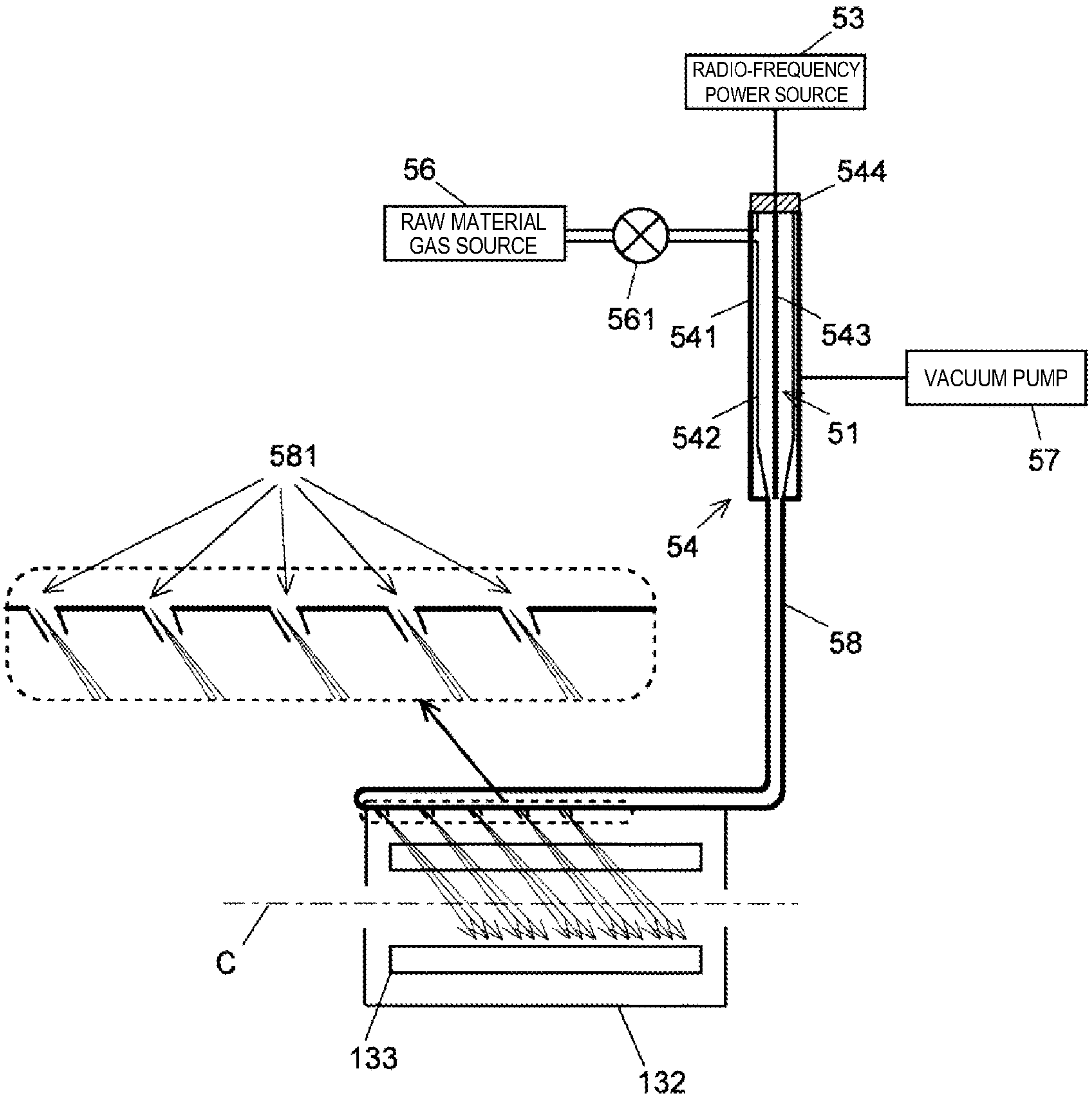
FIG. 2 is a schematic configuration diagram of a radical supply part in the mass spectrometer of the First Example.

In addition, a radical supply part 5 is also connected to the collision cell 132. As illustrated in FIG. 2, the radical supply part 5 includes: a nozzle 54 in which a radical generation chamber 51 is formed; a vacuum pump 57 configured for exhausting the radical generation chamber 51; a radio-frequency power source 53 configured to supply a microwave for generating vacuum discharge in the radical generation chamber 51; the raw material gas source 56 configured to supply the raw material gas into the radical generation chamber 51; and a valve 561 configured to open and close a flow path from the raw material gas source 56 to the radical generation chamber 51.

As the raw material gas, a gas capable of generating radicals corresponding to forms of dissociation of intended precursor ions is used. As the raw material gas, for example, a hydrogen gas, an oxygen gas, water vapor, a hydrogen peroxide gas, a nitrogen gas, or air is used. The hydrogen radicals are generated from the hydrogen gas. The oxygen radicals are generated from the oxygen gas and an ozone gas. The oxygen gas and the hydroxyl radicals are generated from the water vapor. The oxygen radicals, the hydroxy radicals, and the hydrogen radicals are generated from the hydrogen peroxide gas. The nitrogen radicals are generated from the nitrogen gas. The oxygen radicals, the hydroxy radicals, the nitrogen radicals, and the hydrogen radicals are generated from the air.

The nozzle 54 includes a ground electrode 541 configuring a periphery and a torch 542 located inside, and the inside of the torch 542 serves as the radical generation chamber 51. As the torch 542, for example, one torch made of Pyrex (registered trademark) glass can be used. In the radical generation chamber 51, a needle electrode 543 connected to the radio-frequency power source 53 via a connector 544 penetrates in a longitudinal direction of the radical generation chamber 51. In FIG. 2, although a radical source using capacitively coupled discharge is used, a radical source using inductively coupled discharge can also be used.

A transport pipe 58 for transporting the radicals generated in the radical generation chamber 51 to the collision cell 132 is connected to an outlet end of the nozzle 54. The transport pipe 58 is an insulating pipe, and for example, a quartz glass pipe or a borosilicate glass pipe can be used.

A plurality of head parts 581 are provided in a portion of the transport pipe 58 arranged along a wall surface of the collision cell 132. Each head part 581 is provided with an inclined cone-shaped irradiation port configured to irradiate the radicals in a direction intersecting a central axis (the ion optical axis C) of a flight direction of ions. As a result, ions flying inside the collision cell 132 can be uniformly irradiated with the radicals.

In addition, in another embodiment, a voltage having a polarity opposite to that of the ions is applied to an outlet electrode of the collision cell 132, and the ions are accumulated around the outlet electrode. In this case, by intensively irradiating around the outlet electrode with the radicals, a reaction efficiency between the precursor ions and the radicals may be increased, more product ions can be generated, and detection intensity can be increased. Alternatively, conversely, the ions can be accumulated around an inlet electrode of the collision cell 132, and the vicinity of inlet electrode can also be irradiated with the radicals.

As described above, in a case where the ions are accumulated around the outlet electrode of the collision cell 132, product ions that have undergone the collision-induced dissociation (CID) while flying inside the collision cell 132 reach around the outlet electrode, and further undergo radical attachment dissociation there, so that a spectrum equivalent to $MS^3$ (the collision-induced dissociation→the radical attachment dissociation) is easily obtained. In addition, in a case where the ions are accumulated around the inlet electrode of the collision cell 132, product ions that have undergone radical attachment dissociation around the inlet electrode further undergo the collision-induced dissociation (CID) while flying inside the collision cell 132, and a spectrum equivalent to $MS^3$ (the radical attachment dissociation→the collision-induced dissociation) is easily obtained. As described above, in order to complementarily use the spectrum equivalent to $MS^3$ having different characteristics for the structural analysis, it is preferable to configure in such a way that the ions can be accumulated around the inlet electrode and the outlet electrode of the collision cell 132 each time; an electric field configured to accumulate the ions in the inlet electrode and the outlet electrode can be switched appropriately; and in addition, the head part 581 configured to irradiate the radicals can be selected (for example, to open and close each head part 581).

The analysis chamber 14 includes: an ion transport electrode 141 for transporting incident ions from the third intermediate vacuum chamber 13 to an orthogonal acceleration part; an orthogonal acceleration electrode 142 including a pair of electrodes 1421 and 1422 arranged in such a manner as to face each other across an incident optical axis of the ions (an orthogonal acceleration area); an acceleration electrode 143 for accelerating ions sent into a flight space by the orthogonal acceleration electrode 142; a reflectron electrode 144 for forming a return path for ions within the flight space; an ion detector 145; and a flight tube 146 configured to define a periphery of the flight space.

The control/processing part 6 controls operations of each part and has a function of storing and analyzing data obtained by the ion detector 145. A substance of the control/processing part 6 is a general personal computer to which an input part 7 and a display part 8 are connected, and a method file in which measurement conditions are described, a compound database, and the like are stored in a storage part 61.

The control/processing part 6 also includes: additionally as functional blocks, an analysis mode selection part 62, a dissociation operation control part 63, a spectrum data generation part 64, a candidate structure creation part 65, a collision-induced dissociation product ion estimation part 66, a radical attachment dissociation product ion estimation part 67, a structure estimation part 68, and a mass peak intensity comparison part 69. The functional blocks are embodied by performing a mass spectrometry program installed in advance in the personal computer.

Next, operations of the mass spectrometer 1 of the First Example will be described.

When a user sets a sample to be analyzed and gives an instruction to start an analysis, the analysis mode selection part 62 displays two analysis modes of the "simulation analysis mode" and the "spectrum comparison analysis mode" on a screen of the display part 8 to prompt the user to select one.

First, an analysis flow when the user selects the "simulation analysis mode" will be described. Here, a case will be described as an example, where by collision with collision gas molecules, the precursor ions derived from phospholipids (PC 16:0/20:4) undergo the collision-induced dissociation, and by attaching the oxygen radicals, the radicals are caused to attach and dissociate and the product ions are generated. Furthermore, in a stage before the analysis, a sample component is known to be phospholipids, but their class and specific structure are unknown. Therefore, the radical attachment dissociation is caused by the oxygen radicals capable of selectively dissociating double bonds of hydrocarbon chains contained in the phospholipids.

When the simulation analysis mode is selected, the dissociation operation control part 63 performs an auto-MS/MS analysis in a procedure below.

First, a vacuum pump (not illustrated) is operated to exhaust the first intermediate vacuum chamber 11, the second intermediate vacuum chamber 12, the third intermediate vacuum chamber 13, and the analysis chamber 14 to a predetermined degree of vacuum for the mass spectrometry. In addition, the vacuum pump 57 is operated to exhaust the inside of the radical generation chamber 51 to the predetermined degree of vacuum for the radical generation.

Next, the liquid sample is introduced into the ESI probe 101 and ionized. Ions generated from the sample component in the ionization chamber 10 are drawn into the first intermediate vacuum chamber 11 due to a pressure difference between the ionization chamber 10 and the first intermediate vacuum chamber 11, and are converged on the ion optical axis C by the ion lens 111. Ions converged on the ion optical axis C are subsequently drawn into the second intermediate vacuum chamber 12 due to the pressure difference between the first intermediate vacuum chamber 11 and the second intermediate vacuum chamber 12, further converged by the ion guide 121, and drawn into the third intermediate vacuum chamber 13.

During first measurement, any of mass separation by the quadrupole mass filter 131, the collision-induced dissociation and the radical attachment dissociation in the collision cell 132 is not performed, and ions generated from the liquid sample are directly introduced into the analysis chamber 14.

Ions that have entered the analysis chamber 14 are changed in a flight direction by the orthogonal acceleration electrode 142, accelerated by the acceleration electrode 143, and ejected to the flight space. Ions accelerated by the acceleration electrode 143 fly on the return path in a time corresponding to the mass-to-charge ratio, and are detected by the ion detector 145. Detection signals from the ion detector 145 are sequentially output to the control/processing part 6 and stored in the storage part 61.

The spectrum data generation part 64 generates spectrum data based on output signals from the ion detector 145. Here, since ions generated from the sample component are detected by mass separation without dissociation, mass spectrum (MS' spectrum) data is generated.

When the MS' spectrum data is obtained, the dissociation operation control part 63 determines the precursor ions in the MS/MS analysis based on predetermined conditions. The predetermined conditions are, for example, ions corresponding to a mass peak having the highest intensity in the mass spectrum data. When the liquid sample is ionized by the ESI probe 101 as in the present example, in many cases, ions obtained by adding protons to the sample molecule are detected with the highest intensity.

When the precursor ions in the MS/MS analysis are determined, the liquid sample is again introduced into the ESI probe 101 and ionized (the liquid sample may be continuously introduced into the EST probe 101 from the time of the first measurement). When the sample component separated by the column of the liquid chromatograph is measured, the auto-MS/MS analysis is performed during an elution time (retention time) from the column. Tons generated in the ionization chamber are converged in the first intermediate vacuum chamber 11 and the second intermediate vacuum chamber 12 in the same manner as described above, and are drawn into the third intermediate vacuum chamber 13.

In parallel with an introduction of the liquid sample, by opening the valve 561, the raw material gas (a type of gas capable of generating the oxygen radicals, for example, the oxygen gas) is supplied from the gas supply source 52 to the radical generation chamber 51, and microwaves are supplied from a microwave supply source 531 to generate the radicals (the oxygen radicals) inside the radical generation chamber 51. The radicals generated in the radical generation chamber 51 pass through the transport pipe 58 and are supplied into the collision cell 132 through the head part 581.

In addition, the dissociation operation control part 63 opens the valve 43 and introduces the collision gas (for example, the nitrogen gas) from the collision gas source 41 into the collision cell 132.

In the third intermediate vacuum chamber 13, only the precursor ions determined by the dissociation operation control part 63 pass through the quadrupole mass filter 131. A predetermined potential gradient is formed between an outlet end of the quadrupole mass filter 131 and the collision cell 132 to impart energy (the collision energy (CE)) for accelerating the precursor ions to collide with the collision gas. In this way, acceleration energy is imparted to the precursor ions to enter the collision cell 132. A magnitude of the energy imparted to the precursor ions is, for example, 1 eV or more, preferably 5 eV or more, further preferably 10 eV or more, and is typically 100 eV or less, and 30 keV or less in the highest case.

In the collision cell 132, the precursor ions and the collision gas molecules collide with one another, and the product ions are generated by the collision-induced dissociation. In addition, in parallel with this, the oxygen radicals attach to the precursor ions and dissociate to generate the product ions. As a result, the product ions generated by the collision-induced dissociation of the precursor ions and the product ions generated by the radical attachment dissociation are mixed inside the collision cell 132. After a lapse of a predetermined time, the product ions generated from the precursor ions by two types of dissociation are ejected from the collision cell 132, separated by time of flight corresponding to the mass-to-charge ratio of each ion in the flight space within the analysis chamber 14, and then detected by the ion detector 145.

Figure 3:
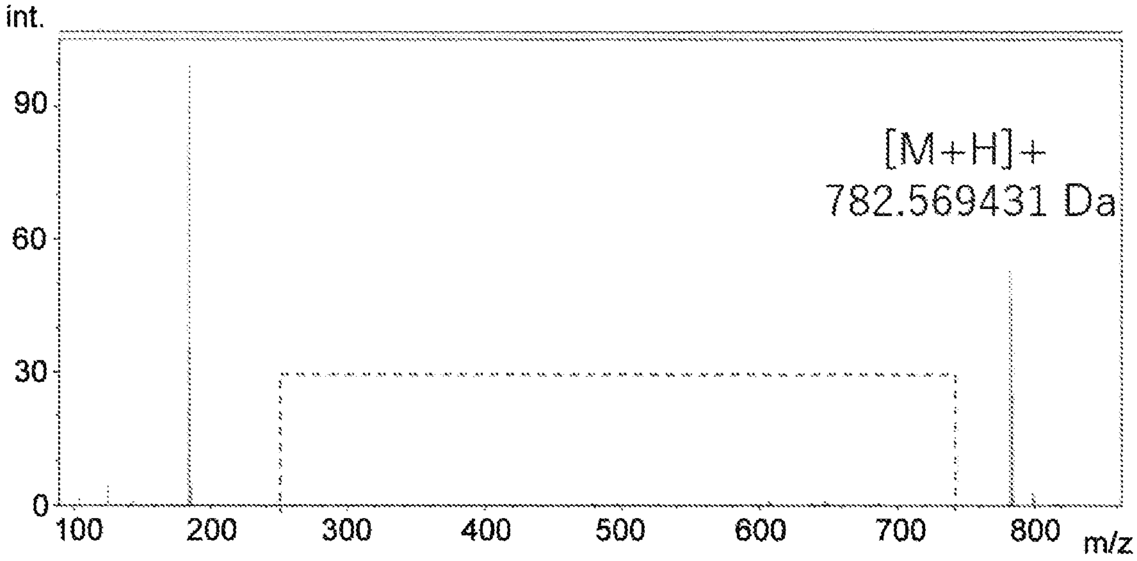
FIG. 3 is a product ion spectrum obtained by dissociating the precursor ions derived from phospholipids through the mass spectrometer of the First Example.

The detection signals of the ion detector 145 are sequentially output to the control/processing part 6 and stored in the storage part 61. The spectrum data generation part 64 generates product ion spectrum ($MS^2$ spectrum) data based on the detection signals of the ion detector 145 stored in the storage part 61, and displays the spectrum on the screen of the display part 8. FIG. 3 is the product ion spectrum obtained by an actual measurement.

In the product ion spectrum illustrated in FIG. 3, a mass peak in which the precursor ions are not dissociated and are detected as they are and another mass peak derived from the product ions generated by the CID appear with high intensity. Then, between the mass peaks, a large number of mass peaks with low intensity as illustrated in an enlarged manner in FIG. 4 appear. In the analysis mode, the mass peaks of the product ions, which conventionally have to be obtained with individually performing both the CID and the OAD, are obtained by a measurement performed once. On the other hand, it is difficult to estimate a structure of the sample molecule by directly analyzing a mass peak of a complicated product ion spectrum and identifying a structure corresponding to each mass peak.

When the product ion spectrum is created, the candidate structure creation part 65 obtains a precise mass (782.569431 Da in the example) of the precursor ions (typically protonated ions) from the mass spectrum (MS' spectrum) data. Here, the precise mass means that an error is 50 ppm or less. By using a time-of-flight mass separation part, the ions can be measured with such precise mass. Then, by using such precise mass, a composition formula can be narrowed down from the precise mass.

As described above, it is known that the sample component is phospholipids in the analysis example. The phospholipids have a basic structure in which two types of fatty acids and a polar group (the head group) containing phosphoric acid are bonded to a glycerol. In addition, the polar group is known to be one of a plurality of types of known structures such as phosphatidylcholine (PC), phosphatidylethanolamine (PE), phosphatidylglycerol (PG), and phosphatidylinositol (PI).

Figure 5:
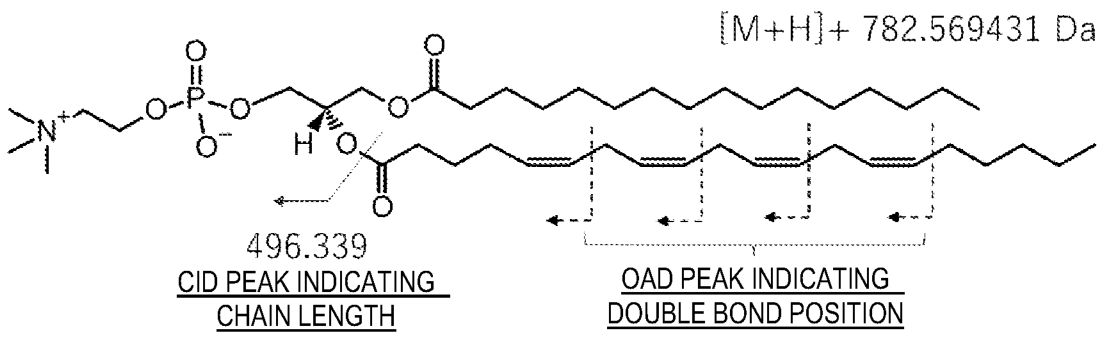
FIG. 5 is a candidate structure created in the simulation analysis mode of the First Example.
Figure 5:
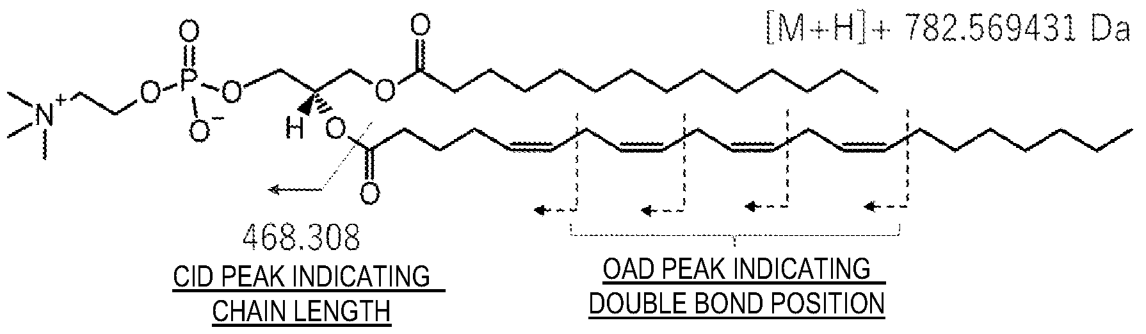

The candidate structure creation part 65 estimates structures that can be taken by the phospholipids as the sample components based on conditions of the precise mass of the precursor ions (782.569431 Da) and the basic structure of the phospholipids, and creates candidate structures corresponding to respective structures. Only two candidate structures will be described below for ease of description. FIG. 5 is a structural formula of the candidate structure 1 (PC 16:0/20:4) and the candidate structure 2 (PC 14:0/22:4). The procedure to be described below is the same for a case where three or more candidate structures are created.

When the candidate structure is created, the collision-induced dissociation product ion estimation part 66 estimates product ions that can be generated by the collision-induced dissociation for each candidate structure. In the case of phospholipids, it is known that the fatty acid bonded to an sn-2 position is easily detached by the collision-induced dissociation (whether a detachment side or a remaining side is detected depends on a type of the polar group). In the example above, it is known that the polar group is all phosphatidylcholine (PC), and the remaining side is detected as a monovalent positive ion in PC. Therefore, for each of the two candidate structures, the mass-to-charge ratios of product ions generated by dissociation of the position are calculated.

In addition, the radical attachment dissociation product ion estimation part 67 estimates product ions that can be generated by the radical-induced dissociation for each candidate structure. In the analysis example, the precursor ions are dissociated by attachment of the oxygen radicals. As described in Patent Literature 3, it is known that the oxygen radicals specifically dissociate the precursor ions at the position of the double bonds between the carbon atoms contained in hydrocarbon chains. Therefore, for each of the two candidate structures, the mass-to-charge ratios of the product ions generated by dissociating the precursor ions at positions of the double bonds between the carbon atoms of hydrocarbon chains are calculated.

Figure 6:
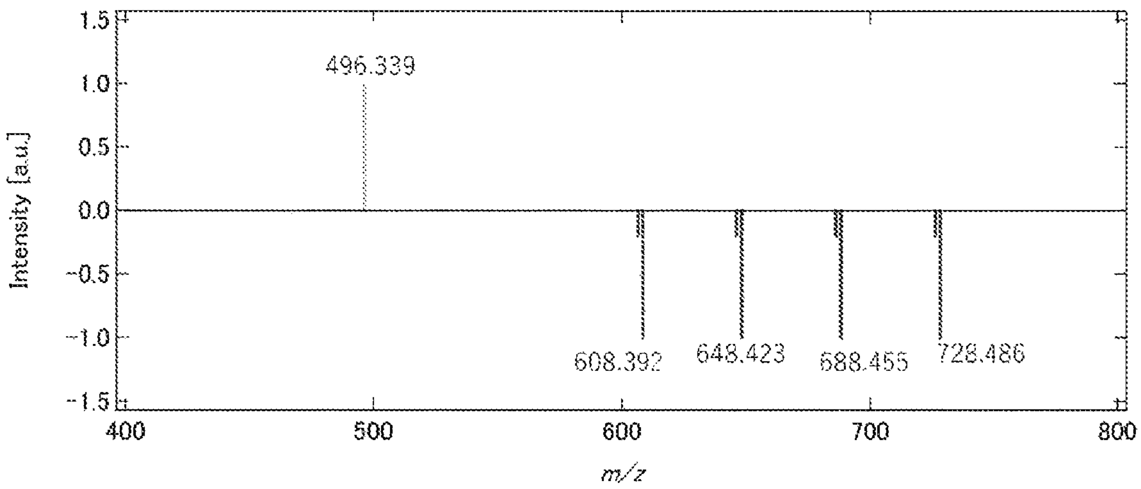
FIG. 6 is a simulation product ion spectrum created for a candidate structure 1 in the simulation analysis mode of the First Example.
Figure 7:
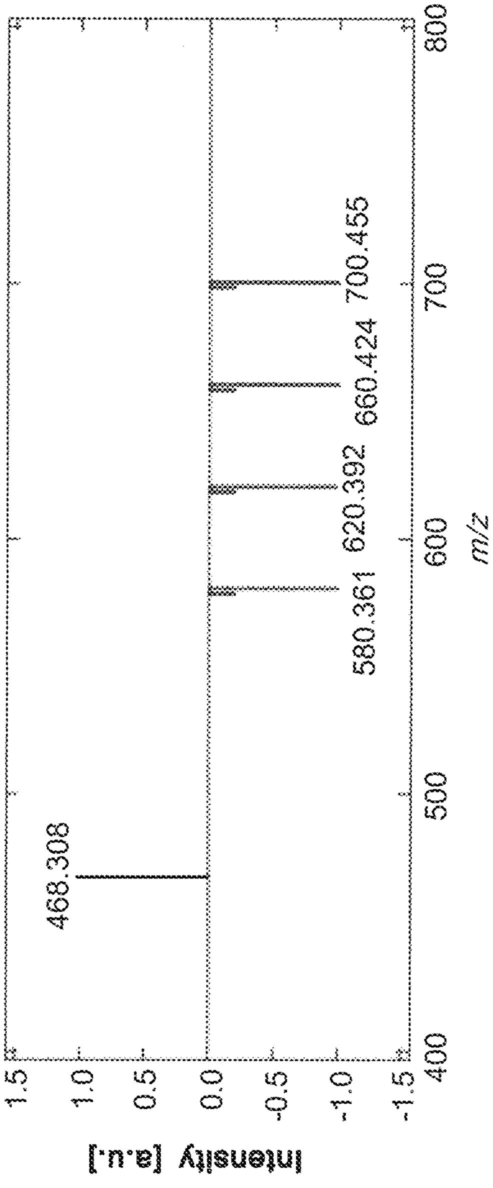
FIG. 7 is a simulation product ion spectrum created for a candidate structure 2 in the simulation analysis mode of the First Example.

FIG. 6 is the simulation product ion spectrum created based on the mass-to-charge ratios between the collision-induced dissociation product ions (upper stage) and the radical attachment dissociation product ions (lower stage) obtained for the candidate structure 1 (PC 16:0/20:4). In addition, FIG. 7 is the simulation product ion spectrum created based on the mass-to-charge ratios between the collision-induced dissociation product ions (upper stage) and the radical attachment dissociation product ions (lower stage) obtained for the candidate structure 2 (PC 14:0/22:4).

When the simulation product ion spectra are created for all the candidate structures, the structure estimation part 68 compares the product ion spectrum obtained by a measurement with each simulation product ion spectrum. Then, based on a matching degree of mass peaks, it is determined which candidate structure of the simulation product ion spectrum reproduces an actually measured product ion spectrum. As a result, the structure estimation part 68 estimates that the sample component is the candidate structure 1 (PC 16:0/20:4) by comparing positions (the mass-to-charge ratios) of mass peaks of measured product ion spectra in FIGS. 3 and 4 with the simulation product ion spectra in FIGS. 6 (candidate structure 1) and 7 (candidate structure 2).

Figure 4:
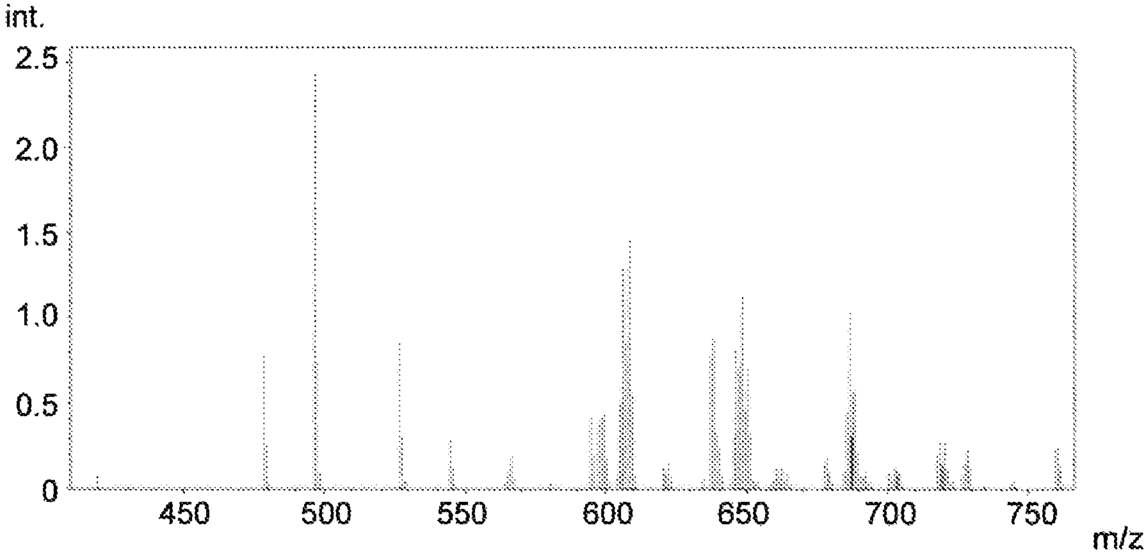
FIG. 4 is a partially enlarged view of a product ion spectrum obtained by dissociating the precursor ions derived from phospholipids in a simulation analysis mode of the First Example.

Furthermore, the actually measured product ion spectra illustrated in FIGS. 3 and 4 include mass peaks that are not included in the simulation spectra. They may include mass peaks derived from the product ions generated by the collision-induced dissociation of the precursor ions inside the collision cell 132 and subsequent oxygen radical attachment dissociation, or from the product ions generated by the oxygen radical attachment dissociation and the subsequent collision-induced dissociation of the precursor ions. In the mass spectrometer 1 that dissociates the precursor ions in the collision cell 132, conventionally, only product ions ($MS^2$ product ions) generated by dissociation of the precursor ions can be measured. However, by using the mass spectrometer 1 of the present example, product ions equivalent to $MS^3$ product ions generated by further dissociation of the $MS^2$ product ions can be measured.

Next, a flow when the user selects the "spectrum comparison analysis mode" will be described. Here, a case where the product ions are generated from the precursor ions derived from ciguatoxins by the collision-induced dissociation and/or the hydrogen radical attachment dissociation (HAD) and analyzed will be described as an example.

When the spectrum comparison analysis mode is selected, a screen for allowing the user to select a type of a single dissociation operation is further displayed. Here, either the collision-induced dissociation or the radical attachment dissociation can be selected.

When the type of dissociation operation is selected, first, the dissociation operation control part 63 operates each part in the same procedure as described above to perform the auto-MS/MS analysis. A flow of processing by the dissociation operation control part 63 is the same as described above. In other words, the mass spectrum (MS' spectrum) data of the sample component is obtained, and the precursor ions in the MS/MS analysis are determined based on the predetermined conditions. Subsequently, the collision gas is introduced into the collision cell 132, the raw material gas is introduced into the radical generation chamber 51 to generate the radicals, and the radicals are introduced into the collision cell 132. As the collision gas, in addition to inert gas such as the nitrogen gas generally used as collision-induced dissociation gas, the hydrogen gas or the water vapor as the raw material gas for generating the radicals can be used (that is, the same gas is used as the collision gas and the raw material gas). Furthermore, unlike the example above, here, the hydrogen gas is used as the raw material gas to generate the hydrogen radicals. A magnitude of energy imparted to the precursor ions is also the same as in the analysis example above, and is, for example, 1 eV or more, preferably 5 eV or more, further preferably 10 eV or more, and is usually 100 eV or less, and 30 keV or less in the highest case.

After the MS/MS spectrum data is obtained by the dissociation operation control part 63, next, only a single dissociation operation (the collision-induced dissociation or the radical attachment dissociation) selected by the user is performed to obtain MS/MS spectrum data.

Figure 8:
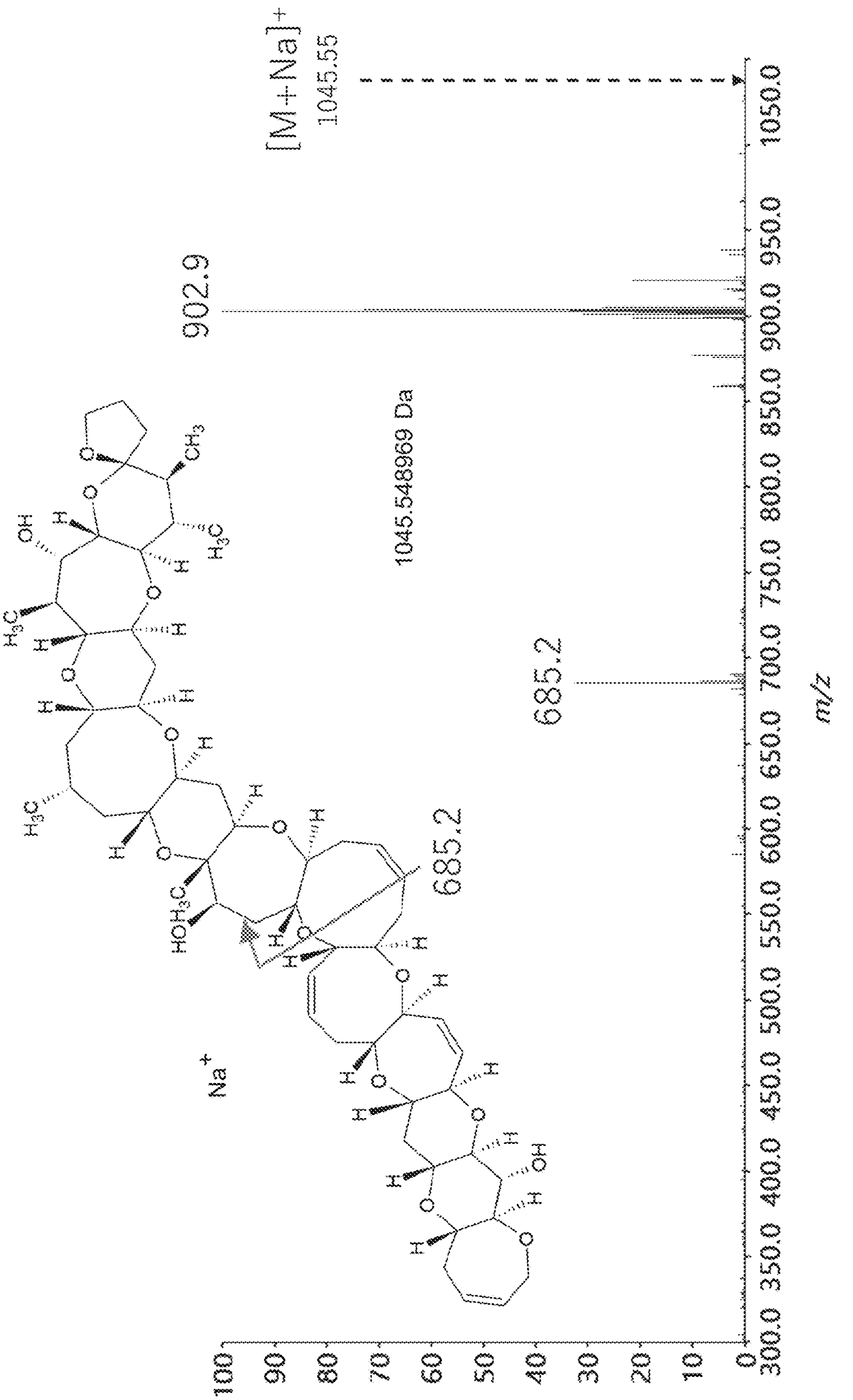
FIG. 8 is a product ion spectrum obtained by the collision-induced dissociation of the precursor ions derived from ciguatoxins in a spectrum comparison analysis mode of the First Example.

FIG. 8 is the product ion spectrum obtained when the collision-induced dissociation is selected as the single dissociation operation. As can be known from the product ion spectrum illustrated in FIG. 8, two types of product ions are generated with high intensity in the collision-induced dissociation.

Figure 9:
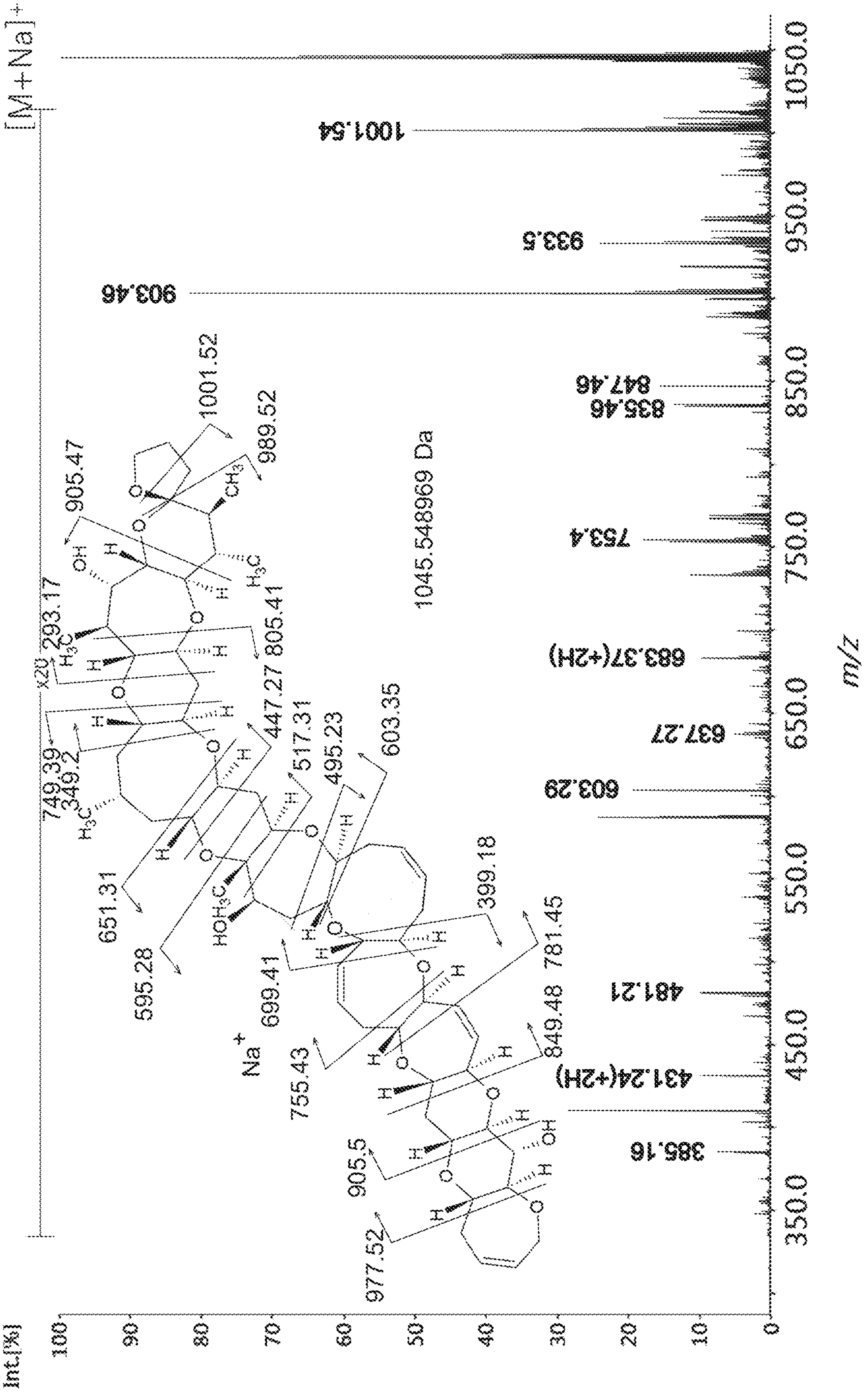
FIG. 9 is a product ion spectrum obtained by hydrogen radical attachment dissociation of the precursor ions derived from ciguatoxins in the spectrum comparison analysis mode of the First Example.

FIG. 9 is the product ion spectrum obtained when the hydrogen radical attachment dissociation is selected as the single dissociation operation. In the hydrogen radical attachment dissociation, it is known that dissociation occurs at a position where a large number of ether bonds are contained in the molecule, and a large number of types of product ions are generated.

Both the mass peaks illustrated in FIG. 8 and the mass peaks illustrated in FIG. 9 are included in the product ion spectrum obtained by the dissociation operation control part 63. However, in the mixed state of both, it is difficult to specify which of product ions corresponding to each mass peak is produced by which dissociation.

In the spectrum comparison analysis mode, the mass peak intensity comparison part 69 compares mass peaks of product ions generated by both the collision-induced dissociation and the radical attachment dissociation with mass peaks of product ions generated by only one of the collision-induced dissociation and the radical attachment dissociation.

When the user selects the collision-induced dissociation as the single dissociation operation, the product ion spectrum illustrated in FIG. 8 is obtained. Mass peaks in the product ion spectrum are mass peaks of the product ions generated by the collision-induced dissociation. On the other hand, in a spectrum of product ions generated by both the collision-induced dissociation and the hydrogen radical attachment dissociation, mass peaks of product ions generated by the hydrogen radical attachment dissociation also appear. In other words, by comparing the spectra, it is known that a mass peak that does not appear in the former but appears in the latter is a mass peak of the product ions generated by the hydrogen radical attachment dissociation.

As described above, in the "spectrum comparison analysis mode", from the information on mass peaks of the spectrum of the product ions generated by both the collision-induced dissociation and the radical attachment dissociation and mass peaks of the spectrum of the product ions generated by only one of the collision-induced dissociation and the radical attachment dissociation, mass peaks corresponding to the product ions produced by the collision-induced dissociation and mass peaks generated by the radical attachment dissociation can be separated, and the information on the partial structure of the sample molecule can be obtained from each mass peak.

In addition, in the "spectrum comparison analysis mode", it is also possible to obtain the product ion spectrum data under the plurality of conditions in which a ratio between the collision-induced dissociation and the radical attachment dissociation is changed, and to compare both. For example, a ratio of the collision-induced dissociation to the radical attachment dissociation can be changed by increasing or decreasing an amount of the collision gas introduced into the collision cell 132 and/or increasing or decreasing a magnitude of collision energy imparted to the precursor ions. In a mass spectrometer including the collision cell 132 as in the First Example, a magnitude of collision energy can be increased or decreased by increasing or decreasing a potential difference between the quadrupole mass filter 131 and the collision cell 132, and in a mass spectrometer including an ion trap described later, a magnitude of collision energy can be increased or decreased by increasing or decreasing a magnitude of exciting the precursor ions. In addition, a ratio of the radical attachment dissociation to the collision-induced dissociation can be changed by changing an amount of the radicals supplied to the collision cell 132 (the First Example) and the ion trap 22 (the Second Example).

As an analysis example, an example will be described in which a product ion spectrum is obtained by changing a ratio between the collision-induced dissociation (CID) and the hydrogen radical attachment dissociation (HAD) in three ways of 10:0 (condition 1, CID only), 5:5 (condition 2, combination use), and 0:10 (condition 3, HAD only). For ease of description, an example in which three conditions are used will be described here, but two conditions or four or more conditions may also be used. Furthermore, it is not essential to include a condition of using only one dissociation method (that is, a ratio of one dissociation is 0).

Figure 10:
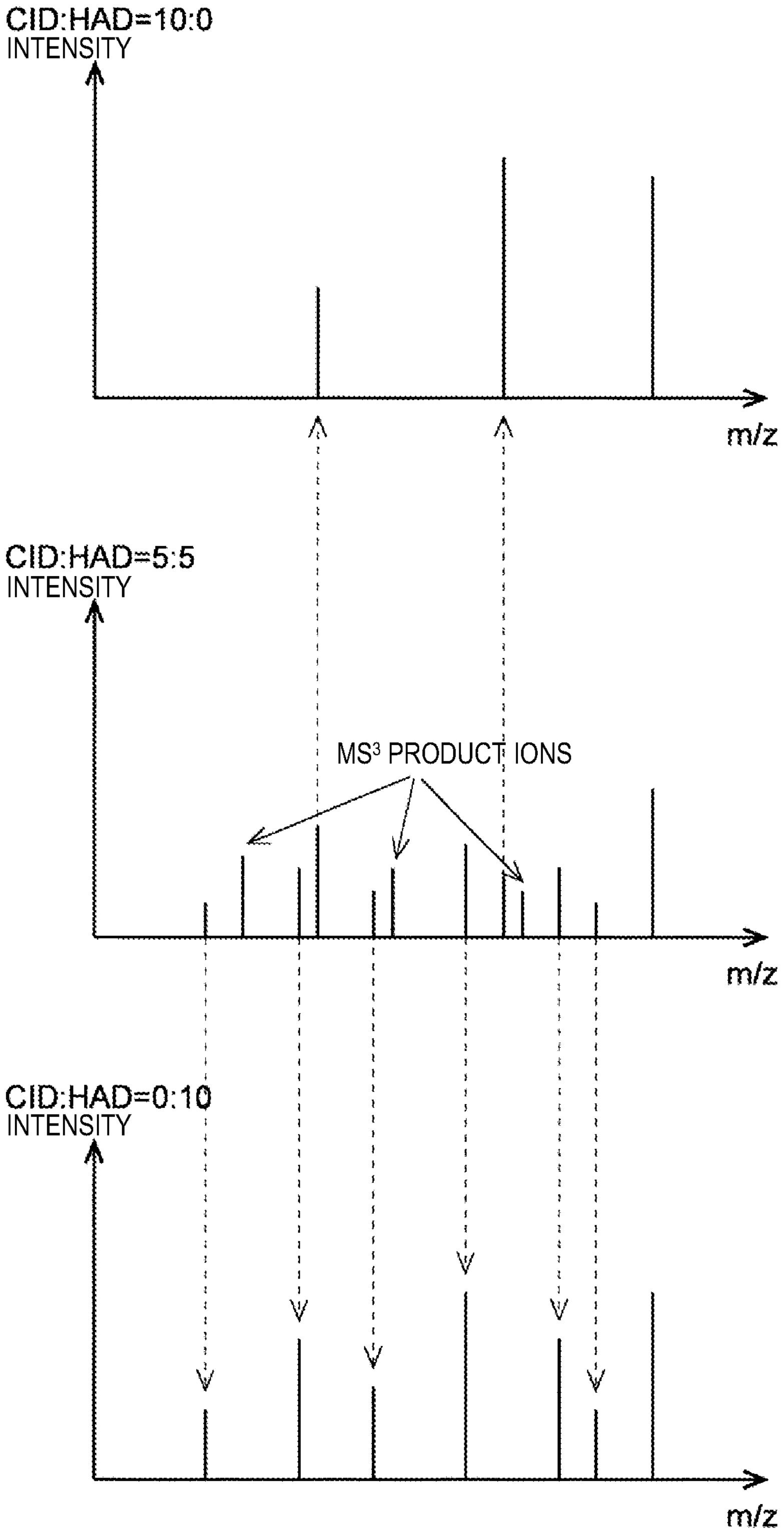
FIG. 10 is a view of explaining product ions obtained under a plurality of conditions in which ratios of the collision-induced dissociation and the radical attachment dissociation are different in the spectrum comparison analysis mode of the First Example.

An example of the product ion spectra obtained under conditions from 1 to 3 is schematically illustrated in FIG. 10. Since only the mass peaks of the CID product ions appear under the condition 1 and only the mass peaks of the HAD product ions appear under the condition 3, the mass peaks of a product ion spectrum under the condition 2 can be assigned to either the CID product ions or the HAD product ions based on the mass peaks under the conditions 1 and 3.

In the product ion spectrum under the condition 2, a mass peak that is not present in either the product ion spectrum under the condition 1 or the product ion spectrum under the condition 3 may appear. This is considered to be product ions generated by further hydrogen radical attachment dissociation of the product ions generated by the collision-induced dissociation of the precursor ions, or the product ions generated by the further collision-induced dissociation of the product ions generated by the hydrogen radical attachment dissociation of the precursor ions. In other words, similar to the product ion spectra in FIGS. 3 and 4, ions equivalent to MS' product ions generated by further dissociation of the $MS^2$ product ions can be measured also in the spectrum comparison analysis mode.

As described above, in the mass spectrometer 1 of the First Example, more information useful for the structural analysis of a compound can be obtained by the simulation analysis mode and the spectrum comparison analysis mode as compared with a conventional technique.

Figure 11:
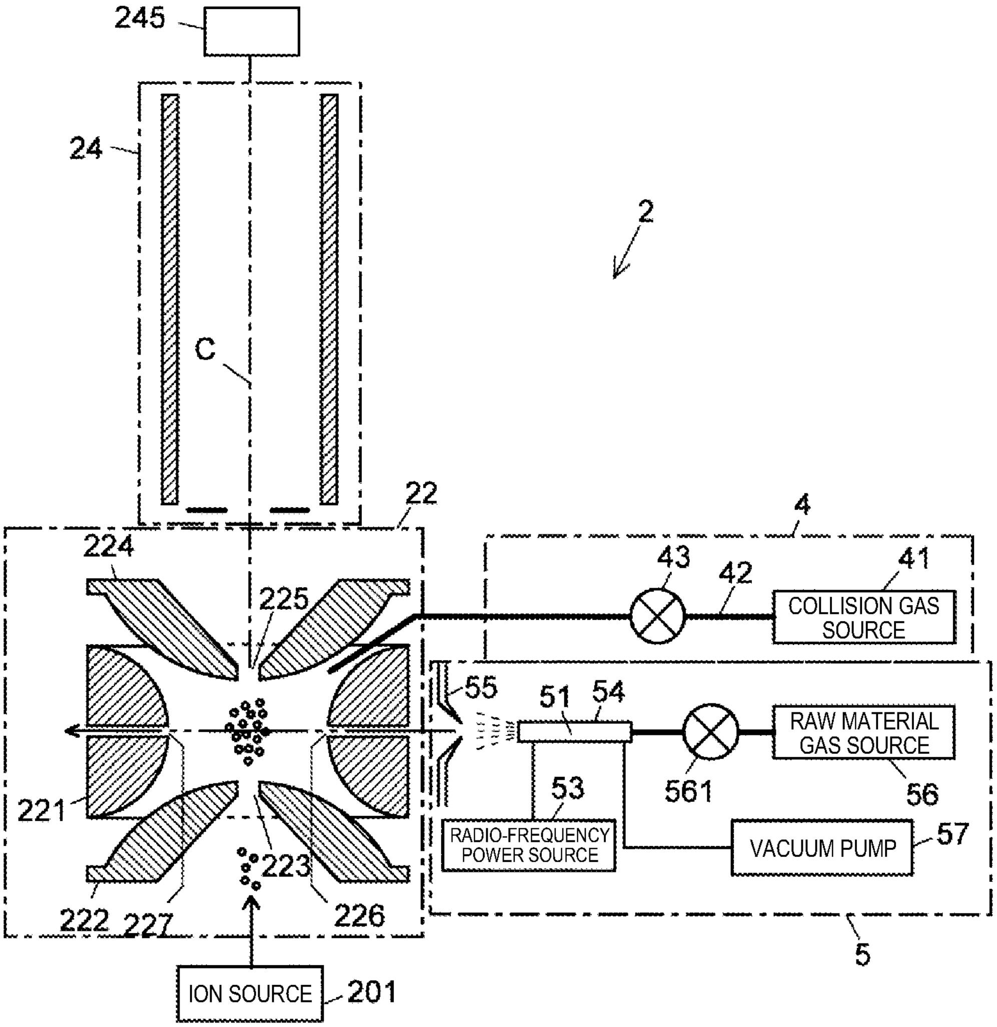
FIG. 11 is a schematic configuration diagram of a mass spectrometer of a Second Example which is an example of the mass spectrometer according to the present invention.

In the First Example, the mass spectrometer 1 configured to dissociate the precursor ions in the collision cell 132 is used, but a mass spectrometer having an ion trap can also be used. FIG. 11 is a schematic configuration of the mass spectrometer 2 including an ion trap of the Second Example. Components common to those of the mass spectrometer 1 in FIG. 1 are denoted by same reference numerals, and description is omitted as appropriate.

The mass spectrometer 2 of the Second Example, inside a vacuum chamber (not illustrated) maintained in vacuum, includes an ion source 201 for ionizing components in a sample; an ion trap 22 for trapping ions generated by the ion source 201 by an action of a radio-frequency electric field; a time-of-flight mass separation part 24 for separating ions ejected from the ion trap 22 according to mass-to-charge ratios; and an ion detector 245 for detecting separated ions. The mass spectrometer 2 of the Second Example further includes the collision gas supply part 4 configured to supply a predetermined type of collision gas into the ion trap 22 in order to dissociate the ions trapped in the ion trap 22; the radical supply part 5 configured to irradiate the precursor ions trapped in the ion trap 22 with the radicals; and the control/processing part 6. Since a configuration of the control/processing part 6 is the same as that of the mass spectrometer 1, illustration and description are omitted.

As in the ion source 201, an ESI probe can be used as in the First Example. In addition, as in the First Example, it is also possible to adopt a configuration in which the sample component separated by the column of the liquid chromatograph is introduced. Alternatively, an MALDI ion source can also be used.

The ion trap 22 is a three-dimensional ion trap which includes a ring electrode 221 having an annular shape, and a pair of end cap electrodes (an inlet-side end cap electrode 222 and an outlet-side end cap electrode 224) that are opposed to each other with the ring electrode 221 interposed between them. A radical introduction port 226 and a radical discharge port 227 are formed in the ring electrode 221; an ion introduction hole 223 is formed in the inlet-side end cap electrode 222; an ion ejection hole 225 is formed in the outlet-side end cap electrode 224. To the ring electrode 221, the inlet-side end cap electrode 222, and the outlet-side end cap electrode 224, any one of a radio-frequency voltage and a direct-current voltage or a combined voltage of them is applied at a predetermined timing.

The radical supply part 5 has a similar configuration as the radical supply part 5 in the mass spectrometer 1 of the First Example. However, in the mass spectrometer 2, the radicals are directly supplied into the ion trap 22 from the nozzle 54 via a skimmer cone 55 without using the transport pipe 58.

The collision gas supply part 4 has a same configuration as the collision gas supply part 4 in the mass spectrometer 1 of the First Example.

Also in the mass spectrometer 2 of the Second Example, a simulation analysis mode and a spectrum comparison analysis mode similar to those of the mass spectrometer 1 of the First Example can be performed. In the mass spectrometer 2 of the Second Example, a measurement in the spectrum comparison analysis mode can be further performed in a procedure different from that of the First Example. The procedure will be described below.

In the simulation analysis mode, when the user selects a type of a single dissociation operation, the dissociation operation control part 63 operates each part to perform the auto-MS/MS analysis. Here, a case where the collision-induced dissociation is selected as the single dissociation operation will be described.

The dissociation operation control part 63 traps the ions generated by the ion source 201 in the ion trap 22, ejects a part of the trapped ions, performs mass separation by the time-of-flight mass separation part 24, and then detects the ions by the ion detector 245. Detection signals from the ion detector 245 are sequentially output to the control/processing part 6 and stored in the storage part 61. The spectrum data generation part 64 generates the mass spectrum ($MS^1$ spectrum) data based on output signals from the ion detector 245.

When the MS spectrum data is obtained, the dissociation operation control part 63 determines the precursor ions in the MS/MS analysis based on the predetermined conditions. Here, for example, the ions corresponding to the mass peak having the highest intensity in the mass spectrum data are determined as the precursor ions.

When the precursor ions in the MS/MS analysis are determined, a predetermined direct-current voltage and a radio-frequency voltage are applied to each electrode of the ion trap 22 to eject ions other than the precursor ions to an outside of the ion trap 22. As a result, only the precursor ions are trapped inside the ion trap 22.

When a selection of the precursor ions is completed, the dissociation operation control part 63 opens the valve 43 and introduces the collision gas (for example, the nitrogen gas) from the collision gas source 41 into the ion trap 22. Then, a predetermined direct-current voltage and a radio-frequency voltage are applied to each electrode of the ion trap 22 to excite the precursor ions. The excitation imparts the collision energy to the precursor ions. Similar to the mass spectrometer 1 of the First Example, a magnitude of the collision energy is, for example, 1 eV or more, preferably 5 eV or more, further preferably 10 eV or more, and is usually 100 eV or less, and 30 keV or less in the highest case.

The precursor ions excited inside the ion trap 22 undergo the collision-induced dissociation by collision with the collision gas, hence the product ions are generated. After the precursor ions are excited in a predetermined time to cause the collision-induced dissociation, a part of generated precursor ions is ejected from the ion trap 22 to the time-of-flight mass separation part 24, mass-separated, and detected by the ion detector 245. The detection signals from the ion detector 245 are sequentially output to the control/processing part 6 and stored in the storage part 61. The spectrum data generation part 64 generates product ion spectrum ($MS^2$ spectrum) data based on the output signals from the ion detector 245.

After releasing a part of the product ions generated in the ion trap 22, the dissociation operation control part 63 supplies the raw material gas from the gas supply source 52 to the radical generation chamber 51 by opening the valve 561, and generates the radicals inside the radical generation chamber 51 by supplying microwaves from the microwave supply source 531. The radicals generated in the radical generation chamber 51 pass through the skimmer cone 55 and are supplied into the ion trap 22.

At the time, the product ions generated by the collision-induced dissociation of the precursor ions are trapped in the ion trap 22. Radicals supplied to the ion trap 22 attach to the product ions to cause further dissociation (the radical attachment dissociation). As a result, the product ions equivalent to $MS^3$ are generated.

When the radicals are supplied to the ion trap 22 in a predetermined time, the dissociation operation control part 63 ejects the ions (undissociated precursor ions, the MS' product ions that have undergone the collision-induced dissociation, and the product ions equivalent to $MS^3$ that have undergone the collision-induced dissociation and the radical attachment dissociation) in the ion trap 22, mass separation is performed in the time-of-flight mass separation part 24, and the ions are detected by the ion detector 245. The detection signals from the ion detector 245 are sequentially output to the control/processing part 6 and stored in the storage part 61. The spectrum data generation part 64 generates product ion spectrum ($MS^3$ spectrum) data based on the output signals from the ion detector 245.

By series of processing above, the $MS^2$ spectrum data and $MS^3$ spectrum data are obtained. From the spectrum data, for example, a mass spectrum illustrated in an upper stage and a mass spectrum illustrated in a middle stage of FIG. 10 can be obtained. Consequently, similar to the mass spectrometer 1 of the First Example, the information on a molecular structure of the sample component can be obtained by comparing mass peaks appearing in the spectra.

In the mass spectrometer 1 of the First Example, in order to obtain the MS' spectrum data, the $MS^2$ spectrum data, and the $MS^3$ spectrum data, it is necessary to introduce the liquid sample and individually perform the mass spectrometry. On the other hand, in the mass spectrometer 2 of the Second Example, three types of mass spectrum data can be obtained by a series of measurements.

Both of the First Example and the Second Example described above are just examples, and can be appropriately changed in accordance with a gist of the present invention. In the First Example and the Second Example described above, in order to be able to perform both the simulation analysis mode and the spectrum comparison analysis mode, a mass separation part capable of measuring an accurate mass of the ions is used, but it is not necessary to measure the accurate mass when only the spectrum comparison analysis mode is performed. Consequently, for example, a triple quadrupole mass spectrometer or a mass spectrometer using only an ion trap as a mass separation part can be used. In addition, as a mass spectrometer capable of measuring the accurate mass of the ions, apart from those described in the First Example and the Second Example above, a Fourier transform ion cyclotron resonance mass spectrometer (FT-ICR), an electric field type Fourier transform mass spectrometer (Orbitrap), or the like may also be used.

In addition, in the Examples above, a case where the radical attachment dissociation is caused by the hydrogen radicals or the oxygen radicals has been described, but the radical attachment dissociation can also be caused by using another type of radicals (for example, the hydroxy radicals or the nitrogen radicals) according to forms of intended dissociation.

[Modes]

It is understood by those skilled in the art that a plurality of exemplary embodiments described above are specific examples of modes below.

(Clause 1)

A mass spectrometry method according to one mode includes steps of:

generating product ions by collision-induced dissociation and radical attachment dissociation of a precursor ion derived from a sample molecule; and obtaining product ion spectrum data by mass-separating and detecting the product ions.

(Clause 2)

In addition, a mass spectrometer according to another mode includes:

a reaction chamber into which a precursor ion derived from a sample molecule is introduced;

a collision gas supply part configured to supply collision gas to the reaction chamber;

a radical supply part configured to supply hydrogen radicals, oxygen radicals, nitrogen radicals, or hydroxyl radicals to the reaction chamber;

a dissociation operation control part configured to control operations of the collision gas supply part and the radical supply part to generate product ions by collision-induced dissociation and radical attachment dissociation of the precursor ion inside the reaction chamber;

an ion detection part configured to mass-separate and detect ions ejected from the reaction chamber; and a spectrum data generation part configured to generate spectrum data based on a detection result by the ion detection part.

In the mass spectrometry method described in Clause 1 and the mass spectrometer described in Clause 2, regarding the precursor ion derived from the sample molecule, both the collision-induced dissociation for dissociating by collision with the collision gas molecules and the radical attachment dissociation for dissociating by attachment of the radicals are performed. In the radical attachment dissociation, according to an intended dissociation mode, the hydrogen radicals, the oxygen radicals, the nitrogen radicals, or the hydroxyl radicals is attached to the precursor ion. The types of radicals to be used in the radical attachment dissociation are not limited to one type, and may be a plurality of types. For example, when water vapor is used as a raw material gas, both the oxygen radicals and the hydroxyl radicals can be simultaneously generated and attached to the precursor ion. In the mass spectrometry method according to Clause 1 and the mass spectrometer according to Clause 2, both the product ions generated by the collision-induced dissociation of the precursor ion and the product ions generated by the radical attachment dissociation of the precursor ion are detected. For example, when the sample molecule is phospholipids, the information useful for estimating the structure of the head group is obtained from the former product ions, and the information useful for estimating the structure of the fatty acid is obtained from the latter product ions. As described above, in the mass spectrometry method described in Clause 1 and the mass spectrometer described in Clause 2, since both the collision-induced dissociation and the radical attachment dissociation are performed, more information useful for the structural analysis of a compound can be obtained by mass spectrometry performed once.

In addition, in the analysis method described in Clause 1 and the mass spectrometer described in Clause 2, besides the product ions described above, the product ions generated by the further radical attachment dissociation of the product ions generated by the collision-induced dissociation of the precursor ion, and the product ions generated by the further collision-induced dissociation of the product ions generated by the radical attachment dissociation of the precursor ion can also be detected. All of the product ions are product ions generated by dissociating the precursor ion twice. For example, in a mass spectrometer using a collision cell as a reaction chamber like a triple quadrupole mass spectrometer, conventionally, only the MS/MS analysis for generating and detecting product ions by dissociating precursor ion once can be performed. However, an $MS^3$ analysis can be performed in a pseudo manner by using the mass spectrometry method described in Clause 1 or the mass spectrometer described in Clause 2.

(Clause 3)

In the mass spectrometer according to Clause 2, the radical supply part is configured to generate the radicals from any of the hydrogen gas, the oxygen gas, the water vapor, the hydrogen peroxide gas, the nitrogen gas, and the air.

In the mass spectrometer described in Clause 3, the radicals can be easily generated using an easily available raw material gas.

(Clause 4)

In the mass spectrometer according to Clause 2 or 3, the ion detection part is configured to measure a mass of ions with accuracy of 50 ppm or more, and the dissociation operation control part is configured to determine the precursor ion based on intensity detected by the ion detection part without dissociating the ions generated from the sample molecule, and the mass spectrometer further includes:

a candidate structure creation part configured to estimate a composition formula of the sample molecule based on a mass of the precursor ion and create a candidate structure of the sample molecule based on the composition formula;

a collision-induced dissociation product ion estimation part configured to estimate the product ions generated by the collision-induced dissociation of the candidate structure;

a radical attachment dissociation product ion estimation part configured to estimate the product ions generated by the radical attachment dissociation of the candidate structure; and a structure estimation part configured to estimate a structure of the sample molecule by comparing mass-to-charge ratios of the product ions estimated by the collision-induced dissociation product ion estimation part and mass-to-charge ratios of the product ions estimated by the radical attachment dissociation product ion estimation part with mass-to-charge ratios of a mass peak included in the product ion spectrum data.

In the mass spectrometer described in Clause 4, the composition formula of the sample molecule is narrowed down by determining a mass of precursor ion with high accuracy of 50 ppm or more. Then, for a candidate structure corresponding to the composition formula, product ions which can be generated by each of the collision-induced dissociation and the radical attachment dissociation are estimated. Then, by comparing a mass peak of product ions obtained by the actual measurement with a mass peak of a product ion spectrum corresponding to each candidate structure created by a simulation, it is possible to estimate which of the candidate structures the sample component is.

(Clause 5)

In the mass spectrometer according to Clause 2 or 3, the dissociation operation control part is configured to further dissociate the precursor ion by only one of the collision-induced dissociation and the radical attachment dissociation inside the reaction chamber to generate the product ions, and the mass spectrometer further includes:

a mass peak intensity comparison part configured to compare intensity of a mass peak included in the product ion spectrum data generated based on a detection result of the product ions generated by only one dissociation operation with intensity of a mass peak included in the product ion spectrum data generated based on a detection result of the product ions generated by the collision-induced dissociation and the radical attachment dissociation.

In the mass spectrometer described in Clause 5, by comparing the spectrum data of the product ions generated by only one of the collision-induced dissociation and the radical attachment dissociation with the spectrum data of the product ions generated by both the collision-induced dissociation and the radical attachment dissociation, it is possible to estimate which dissociation a mass peak appearing in the latter product ion spectrum is caused by.

(Clause 6)

In the mass spectrometer according to any one of Clauses 2 to 5, the dissociation operation control part is configured to perform the collision-induced dissociation and the radical attachment dissociation simultaneously.

The mass spectrometer described in Clause 6 can measure the product ions generated by the further radical attachment dissociation of the product ions generated by the collision-induced dissociation of the precursor ion, or the product ions generated by the further collision-induced dissociation of the product ions generated by the radical attachment dissociation of the precursor ion. That is, the product ions equivalent to MS' can be measured by mass spectrometry performed once.

(Clause 7)

In the mass spectrometer according to Clause 6, the reaction chamber is a collision cell.

By using the mass spectrometer described in Clause 6 as the mass spectrometer described in Clause 7 using a collision cell as a reaction chamber, it is possible to obtain a product ion spectrum equivalent to $MS^3$ that has not been conventionally obtained.

(Clause 8)

In the mass spectrometer according to any one of Clauses 2 to 5, the dissociation operation control part is configured to perform one of the collision-induced dissociation and the radical attachment dissociation, and subsequently configured to perform the other one to cause the collision-induced dissociation and the radical attachment dissociation of the precursor ion.

In the mass spectrometer described in Clause 8, one of the collision-induced dissociation and the radical attachment dissociation is performed, and the other is subsequently performed. By measuring intensity of the product ions at a time of each dissociation operation, mass peaks caused by the collision-induced dissociation and the radical attachment dissociation can be easily assigned.

(Clause 9)

In the mass spectrometer according to any one of Clauses 2 to 5, the dissociation operation control part is configured to generate the product ions from the precursor ion under a plurality of conditions with different relative intensities of the collision-induced dissociation and the radical attachment dissociation, and the spectrum data generation part is configured to generate the product ion spectrum data for each of the plurality of conditions.

In the mass spectrometer according to Clause 9, by comparing intensities of mass peaks of product ion spectra obtained under the plurality of conditions with different relative intensities of the collision-induced dissociation and the radical attachment dissociation, it is possible to identify the mass peak corresponding to the product ions generated by the collision-induced dissociation, the mass peak corresponding to the product ions generated by the radical attachment dissociation, and a mass peak corresponding to product ions generated by two-stage dissociation of the collision-induced dissociation and the radical attachment dissociation.

(Clause 10)

In the mass spectrometer according to any one of Clauses 2 to 6, 8, and 9, the reaction chamber is an ion trap.

The configuration described in Clause 9 can be implemented in the mass spectrometer including an ion trap as a reaction chamber as described in Clause 10.

REFERENCE SIGNS LIST

1, 2 . . . Mass Spectrometer
10 . . . Ionization Chamber
101 . . . ESI Probe
11 . . . First Intermediate Vacuum Chamber
111 . . . Ion Lens
12 . . . Second Intermediate Vacuum Chamber
121 . . . Ion Guide
13 . . . Third Intermediate Vacuum Chamber
131 . . . Quadrupole Mass Filter
132 . . . Collision Cell
133 . . . Multipole Ion Guide
134 . . . Ion Guide
14 . . . Analysis Chamber
141 . . . Ion Transport Electrode
142 . . . Orthogonal Acceleration Electrode
143 . . . Acceleration Electrode
144 . . . Reflectron Electrode
145 . . . Ion Detector
146 . . . Flight Tube
201 . . . Ion Source
22 . . . Ion Trap
221 . . . Ring Electrode
222 . . . Inlet-Side End Cap Electrode
224 . . . Outlet-Side End Cap Electrode
24 . . . Time-of-flight Mass Separation Part
245 . . . Ion Detector
4 . . . Collision Gas Supply Part
41 . . . Collision Gas Source
42 . . . Gas Introduction Flow Path
43 . . . Valve
5 . . . Radical Supply Part
51 . . . Radical Generation Chamber
52 . . . Gas Supply Source
53 . . . Radio-frequency Power Source
54 . . . Nozzle
55 . . . Skimmer Cone
56 . . . Raw Material Gas Source
561 . . . Valve
57 . . . Vacuum Pump
58 . . . Transport Pipe
581 . . . Head Part
6 . . . Control/Processing Part
61 . . . Storage Part
62 . . . Analysis Mode Selection Part
63 . . . Dissociation Operation Control Part
64 . . . Spectrum Data Generation Part
65 . . . Candidate Structure Creation Part
66 . . . Collision-induced Dissociation Product Ion Estimation Part
67 . . . Radical Attachment Dissociation Product Ion Estimation Part
68 . . . Structure Estimation Part
69 . . . Mass Peak Intensity Comparison Part
7 . . . Input Part
8 . . . Display Part

The invention claimed is:

1. A mass spectrometry method comprising steps of:
generating product ions by collision-induced dissociation and radical attachment dissociation of a precursor ion derived from a sample molecule; and
obtaining product ion spectrum data by mass-separating and detecting the product ions, wherein
a mass of ions are measured with accuracy of 50 ppm or more, and
the precursor ion is determined based on intensities of the product ions detected without dissociating ions generated from the sample molecule,
the mass spectrometry method further comprising steps of:
estimating a composition formula of the sample molecule based on a mass of the precursor ion and creating a candidate structure of the sample molecule based on the composition formula;
estimating the product ions generated by the collision-induced dissociation of the candidate structure;
estimating the product ions generated by the radical attachment dissociation of the candidate structure; and
estimating a structure of the sample molecule by comparing mass-to-charge ratios of the estimated product ions generated by the collision-induced dissociation and mass-to-charge ratios of the estimated product ions generated by the radical attachment dissociation with mass-to-charge ratios of a mass peak included in the product ion spectrum data.

2. The mass spectrometry method according to claim 1, wherein radicals are generated from any of a hydrogen gas, an oxygen gas, water vapor, a hydrogen peroxide gas, a nitrogen gas, and air.

3. The mass spectrometry method according to claim 1, wherein the collision-induced dissociation and the radical attachment dissociation are performed simultaneously.

4. The mass spectrometry method according to claim 3, wherein the product ions are generated in a collision cell.

5. The mass spectrometry method according to claim 1, wherein one of the collision-induced dissociation and the radical attachment dissociation is performed, and subsequently the other one is performed to cause the collision-induced dissociation and the radical attachment dissociation of the precursor ion.

6. A mass spectrometry method comprising steps of:
generating product ions by collision-induced dissociation and radical attachment dissociation of a precursor ion derived from a sample molecule; and
obtaining product ion spectrum data by mass-separating and detecting the product ions, wherein:
product ions are further generated by only one of the collision-induced dissociation and the radical attachment dissociation,
the mass spectrometry method further comprising steps of:
comparing intensity of a mass peak included in the product ion spectrum data generated based on a detection result of the product ions generated by only one dissociation operation with intensity of a mass peak included in the product ion spectrum data generated based on a detection result of the product ions generated by the collision-induced dissociation and the radical attachment dissociation.

7. The mass spectrometry method according to claim 6, wherein radicals are generated from any of a hydrogen gas, an oxygen gas, water vapor, a hydrogen peroxide gas, a nitrogen gas, and air.

8. The mass spectrometry method according to claim 6, wherein the collision-induced dissociation and the radical attachment dissociation are performed simultaneously.

9. The mass spectrometry method according to claim 8, wherein the product ions are generated in a collision cell.

10. The mass spectrometry method according to claim 6, wherein one of the collision-induced dissociation and the radical attachment dissociation is performed, and subsequently the other one is performed to cause the collision-induced dissociation and the radical attachment dissociation of the precursor ion.

11. The mass spectrometry method according to claim 10, wherein the product ions are generated in an ion trap.

12. The mass spectrometry method according to claim 6, wherein:

the product ions are generated from the precursor ion under a plurality of conditions with different relative intensities of the collision-induced dissociation and the radical attachment dissociation, and the product ion spectrum data are generated for each of the plurality of conditions.

13. The mass spectrometry method according to claim 12, wherein the product ions are generated in an ion trap.

14. A mass spectrometer comprising:

a reaction chamber into which a precursor ion derived from a sample molecule is introduced;

a collision gas supply part configured to supply collision gas to the reaction chamber;

a radical supply part configured to supply hydrogen radicals, oxygen radicals, nitrogen radicals, or hydroxyl radicals to the reaction chamber;

a dissociation operation control part configured to control operations of the collision gas supply part and the radical supply part to generate product ions by collision-induced dissociation and radical attachment dissociation of the precursor ion inside the reaction chamber;

an ion detection part configured to mass-separate and detect ions ejected from the reaction chamber; and a spectrum data generation part configured to generate spectrum data based on a detection result by the ion detection part, wherein:

the dissociation operation control part is configured to further dissociate the precursor ion by only one of the collision-induced dissociation and the radical attachment dissociation inside the reaction chamber to generate the product ions, the mass spectrometer further comprising:

a mass peak intensity comparison part configured to compare intensity of a mass peak included in the product ion spectrum data generated based on a detection result of the product ions generated by only one dissociation operation with intensity of a mass peak included in the product ion spectrum data generated based on a detection result of the product ions generated by the collision-induced dissociation and the radical attachment dissociation.

* * * * *